Jan. 4, 1966   C. D. GHOLSON   3,227,002
FORCED FEED BEARING LUBRICATING SYSTEM
Filed Oct. 7, 1963
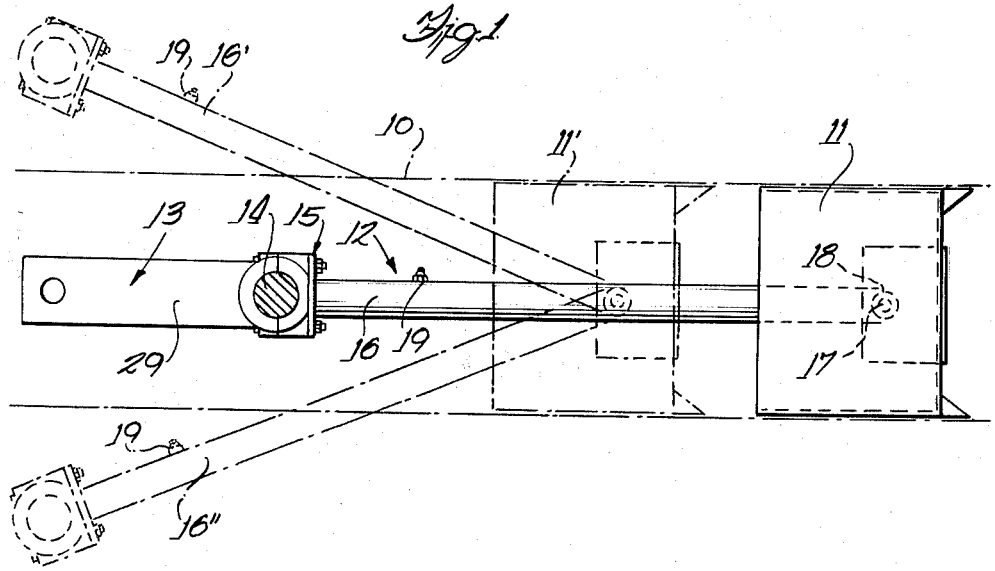
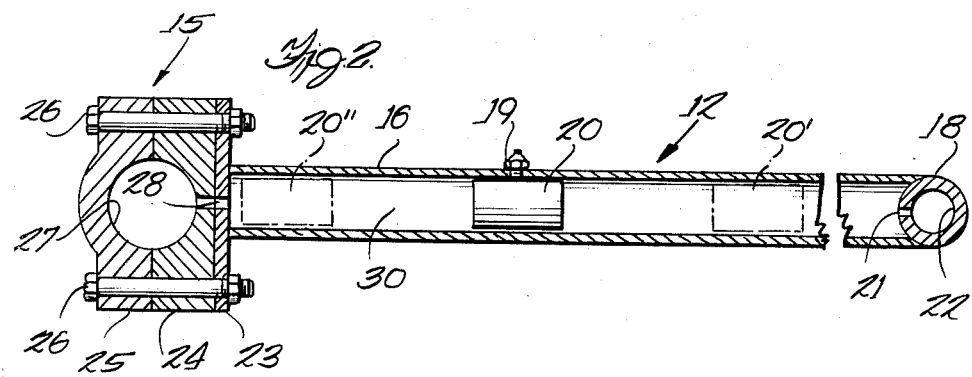
INVENTOR.
Cary D. Gholson
BY
Attorney

United States Patent Office 3,227,002
Patented Jan. 4, 1966

3,227,002
FORCED FEED BEARING LUBRICATING SYSTEM
Cary D. Gholson, Memphis, Tenn., assignor to International Harvester Company, Chicago, Ill., a corporation of New Jersey
Filed Oct. 7, 1963, Ser. No. 314,265
4 Claims. (Cl. 74—587)

This invention pertains to a new and improved lubrication system for the bearing surfaces of a piston assembly. More particularly, the present invention comprises a novel forced feed lubrication system for the crank and piston pin bearings of a hay baler plunger.

The objects of the present invention are

First: to provide, in general, an inexpensive forced feed lubrication supply for the bearing surfaces of a piston assembly by using the reciprocating motions of the piston pitman to generate the lubricant pumping force;

Second: to provide, in particular, a double-acting, free-sliding piston in the interior of a pitman to pump lubricant from the pitman interior to various bearing surface, the free-sliding piston being reciprocated by inertia forces derived from the reciprocating motion of the pitman.

Where bearings are lubricated by grease applied with a hand grease gun (e.g. Alemite lubrication), the maximum amount of grease protecting the bearings is limited to the small charge ejected by the grease gun into the bearing clearance. The grease on the bearings must, therefore, be watched so that it does not become exhausted and allow the bearings to burn out. Of course, a lubricate pumping system may be used, but this is too costly for many applications. These obstacles are overcome by the present invention, which provides an ample reservoir of grease and an inexpensive pump for forcing the grease to the bearing surfaces.

In the drawings:

FIG. 1 shows the relative location of the invention to the plunger of a horizontal hay baling chamber, and FIG. 2 shows the invention incorporated in the pitman of the baler plunger of FIG. 1.

The hay baling mechanism shown in FIG. 1 comprises a horizontal baling chamber 10, a plunger 11 for compressing the hay, a pitman assembly 12 for reciprocating plunger 11, and a crankshaft assembly 13 for driving pitman assembly 12. The numeral 11' and the broken lines associated therewith indicate plunger 11 at midstroke. Similarly, numerals 16' and 16" and the related broken lines indicate shank 16 at intermediate stroke positions. Since other aspects of hay balers are irrelevant for present purposes, the reader is referred to U.S. Patents Nos. 2,450,082 and No. 2,923,230 for general information about hay balers.

The novel features of the present invention are shown in detail in FIG. 2, where the pitman assembly is indicated in general at 12. Pitman assembly 12 comprises, in turn, a hollow shank 16 containing a lubricant reservoir 30 and a double-acting, free-sliding piston 20. A crank bearing assembly 15 is located at one end of shank 16, and a piston pin bearing 18 is located at the other end.

Crank bearing assembly 15 (FIG. 2) comprises a base 23 attached directly to shank 16, a separate first bearing portion 24, a bearing cap 25, and two bolts 26, that hold the bearing elements together. The bearing surface of bore 27 journals crank arm 14 (FIG. 1). Passage 28 is a lubricant discharge from reservoir or cavity 30 to the surface of bearing 27.

Piston pin bearing 18 (FIG. 2) comprises a tubular member attached to shank 16. Bore 22 serves as a bearing for journaling piston pin 17 (FIG. 1). Passage 21 is a lubricant discharge passage from reservoir 30 to the surface of bearing 22.

Piston 20, which is placed inside shank 16 before the two end bearings are attached, is detached and clears the walls of reservoir 30—hence, its designation as "free-sliding." Both ends of piston 20 pump grease to the bearing surfaces, one end pumping through passage 21, the other end through passage 28. The broken lines at 20' and 20" represent piston 20 at different pumping stations.

The lubricant system is put into operation by injecting a supply of grease into reservoir 30 through grease fitting 19. Rotation of crank 29 moves shank 16 through the usual sequence of motions executed by a connecting rod, the broken lines at 16' and 16" representing shank 16 at the mid-stroke positions of a cycle. Piston 20 is carried along with shank 16 and does not move relative to shank 16 until the shank 16 approaches the dead center position of a stroke and decelerates. Since piston 20 is free-sliding, it does not decelerate in unison with shank 16 but continues to move ahead under the influence of inertia, thereby applying pressure to the grease in reservoir 30 and forcing it out of either grease discharge passage 21 or 28. On the next stroke of shank 16, the same pumping action of piston 20 occurs, but in the opposite direction. When the grease in reservoir 30 is exhausted, free-sliding piston 20 strikes the ends of reservoir 30 and produces a knocking sound to warn the attendant that the grease reserve is exhausted.

In the foregoing description, a new and improved lubrication system for pitman bearings has been shown as applied to the plunger of a hay baler. However, as the concept of this invention may be applied to other reciprocating elements (e.g. a baler quadrant crank, a steam engine piston, etc.), it is clear that the present invention need not have the exact form shown and described, but may embrace such obvious variation as fall within the spirit and scope of the attached claims.

The invention claimed is:

1. A forced feed lubrication system, comprising: a pitman for reciprocating a piston, a crank bearing surface at one end of said pitman, a piston pin bearing surface at the other end of said pitman, a cavity in said pitman for storing a supply of lubricant, a free sliding, double-acting piston in said cavity for pumping said lubricant, a lubricant inlet passage leading to said cavity, and a lubricant discharge passage for each action of said double-acting piston leading from said cavity to a separate one of said bearing surfaces, and means in said cavity for arresting said double-acting piston when said lubricant supply is depleted, said arresting actions of said double-acting piston by said arresting means producing an audible sound.

2. A forced feed lubrication system, comprising: a pitman for reciprocating a piston through a substantially horizontal stroke, a crank bearing surface at one end of said pitman, a piston pin bearing surface at the other end of said pitman, a reservoir in said pitman for storing a supply of lubricant, a free sliding, double-acting piston in said reservoir for pumping said lubricant, a lubricant inlet passage leading to said cavity, and a separate lubricant discharge passage for each action of said double-acting piston leading from said cavity to each of said bearing surfaces, and means in said cavity for arresting said double-acting piston when said lubricant supply is depleted, said arresting actions of said double-acting piston by said arresting means producing an audible sound.

3. A forced-feed lubrication system, comprising: a pitman for a piston, a cavity in said pitman for storing a supply of lubricant, a free-sliding, double-acting piston movable in said cavity between two separated points, means in said cavity for arresting said double-acting piston at each of said separated points when said lubricant supply is depleted, said arresting actions of said double-acting piston by said arresting means producing an audible sound, a separate lubricant discharge passage leading from said cavity for each action of said double-acting piston, and a lubricant supply inlet leading into said cavity.

4. A forced-feed lubrication system, as recited in claim 3, wherein: said cavity is a cylindrical bore, both ends of said bore are closed, and said bore ends comprise said arresting means.

References Cited by the Examiner

UNITED STATES PATENTS

| | | | |
|---|---|---|---|
| 292,264 | 1/1884 | Smith Jr. | 74—587 X |
| 503,506 | 8/1893 | Traves | 184—26 |
| 1,761,699 | 6/1930 | Wulf | 184—26 |

LAVERNE D. GEIGER, *Primary Examiner.*

MILTON KAUFMAN, *Examiner.*